(12) United States Patent
Zetterström

(10) Patent No.: US 6,398,451 B1
(45) Date of Patent: Jun. 4, 2002

(54) MOUNTING ARRANGEMENT

(75) Inventor: Sigvard Zetterström, Hakenäset (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/403,460

(22) PCT Filed: Apr. 9, 1998

(86) PCT No.: PCT/SE98/00659

§ 371 (c)(1),
(2), (4) Date: Jan. 7, 2000

(87) PCT Pub. No.: WO98/48180

PCT Pub. Date: Oct. 29, 1998

(30) Foreign Application Priority Data

Apr. 23, 1997 (SE) .............................. 9701516

(51) Int. Cl.[7] ...................... F16B 7/08; B60G 21/055; F16F 1/16
(52) U.S. Cl. ................. 403/347; 403/334; 403/383; 280/124.106; 280/124.148
(58) Field of Search ............... 280/124.106, 124.148, 280/124.152; 403/334, 347, 383, 109.5, 375, 373

(56) References Cited

U.S. PATENT DOCUMENTS

| | | | | | |
|---|---|---|---|---|---|
| 2,480,934 | A | * | 9/1949 | Julien | 280/124.13 X |
| 4,076,285 | A | * | 2/1978 | Martinez | 285/332 X |
| 4,243,247 | A | * | 1/1981 | Kataoka | 280/124.13 X |
| 4,540,197 | A | | 9/1985 | Finn et al. | 3/0 |
| 4,659,069 | A | * | 4/1987 | Odobasic | 280/124.128 X |
| 4,846,490 | A | * | 7/1989 | Hashimoto et al. | 403/295 X |
| 4,952,092 | A | * | 8/1990 | Ballerstein | 7/8 |
| 5,129,672 | A | * | 7/1992 | Hiromoto et al. | 280/124.06 |
| 5,176,415 | A | * | 1/1993 | Choksi | 285/332.1 X |
| 5,836,712 | A | * | 11/1998 | Zetterstrom | 403/334 X |

FOREIGN PATENT DOCUMENTS

| | | | |
|---|---|---|---|
| JP | 62-101507 | * | 12/1987 |
| JP | 62-101508 | * | 12/1987 |
| JP | 62-101509 | * | 12/1987 |
| JP | 62-101510 | * | 12/1987 |
| JP | 62-101511 | * | 12/1987 |
| JP | 62-101512 | * | 12/1987 |
| JP | 62-231808 | * | 12/1987 |
| SE | 502 862 C2 | 2/1996 | .................. 11/18 |
| WO | 96/12897 | 10/1995 | |
| WO | 96/12638 | 5/1996 | .................. 29/4 |

OTHER PUBLICATIONS

Patent Abstracts of Japan, vol. 12, No. 98, M–680 abstract of JP 62–231808 A (Mazda Motor Corp.) Oct. 12, 1987.

* cited by examiner

Primary Examiner—Lynne H. Browne
Assistant Examiner—Ernesto Garcia
(74) Attorney, Agent, or Firm—Lerner, David, Littenberg, Krumholz & Mentlik, LLP

(57) ABSTRACT

Apparatus is disclosed for mounting a spring to a connecting arm forming a portion of a vehicle wheel suspension in which the apparatus includes a connector affixed to the end of the spring and disposed on one side of the connecting arm, a lock disposed on the other side of the connecting arm, and fasteners extending through the connecting arm for attaching the connector to the lock.

10 Claims, 3 Drawing Sheets

MOUNTING ARRANGEMENT

FIELD OF THE INVENTION

The present invention relates to mounting apparatus. The present invention is in particular intended to be used for attaching a spring element to a connection arm which is part of the wheel suspension of a vehicle.

BACKGROUND OF THE INVENTION

At present, various types of suspension systems are used for the axles of vehicles, e.g. cars. In a known manner, such wheel suspensions are arranged to permit mounting and springing motion of the wheels of the vehicle, which in turn results in a more comfortable ride for the occupants and improves the vehicle's road-holding while prolonging its life.

A number of different types of wheel suspensions are known, and are included in systems with, for example, rigid or divided axles which can be provided with spring elements, shock absorbers and other components. In addition, force-absorbing connection arms are often used to connect the vehicle's wheels and its body, and stabilizers are used to suppress swaying of the vehicle.

A known wheel suspension for vehicles is described in published International Application No. WO 96/12897. This suspension comprises a U-shaped spring element which is manufactured from a tube of composite material. Each end of the spring element is attached to a connection arm, which in turn is attached between one of the vehicle's wheel bearings and part of the vehicle body in the form of a structural framework element. In addition, the wheel suspension is designed so that the framework element supports the spring element. The spring element acts partly as a spring, absorbing vertical and lateral forces and partly as a stabilizer. As the spring element is manufactured of composite material, the wheel suspension thus has a lower weight than when known technology is used.

In the arrangement according to WO 96/12897, attachment of the spring element to the respective connection arm is carried out using a special mounting arrangement. The spring element is thus designed with one end having an external diameter which increases gradually in the direction of that end, and which is located on a tapering nose element protruding out of the connection arm.

Although the known apparatus works satisfactorily in principle there are certain problems associated therewith. In particular, it should be noted that the spring element is rigidly attached to the connection arm which means that no forces are absorbed at the point of attachment. This can, in turn, result in the attachment not providing the suspension which is required in order to provide a comfortable ride for the occupants of the vehicle. In addition, there are strong bending forces at the attachment point of the spring element.

An object of the present invention is to achieve an improved mounting arrangement for connection of two components in particular for attaching a spring element of the above-mentioned type to a connection arm, which mounting arrangement provides a secure connection and an optimal load absorption.

SUMMARY OF THE INVENTION

In accordance with the present invention, this and other objects have now been realized by the discovery of apparatus for mounting a spring element having an end to a connecting arm forming a portion of a vehicle wheel suspension, the apparatus comprising a connector fixed to the end of the spring element and disposed on one side of the connecting arm, a locking member disposed on the other side of the connecting arm, and fastening means extending through the connecting arm for attaching the connector to the locking member. In a preferred embodiment, the connecting arm includes at least one bushing, and wherein the locking member is attached to the connector through the at least one bushing. Preferably, the fastening means attaches the connector, to the locking member through the at least one bushing.

In accordance with one embodiment of the apparatus of the present invention, the end of the spring element has a diameter which increases in a direction towards the connecting arm. Preferably, the end of the spring element includes an inner diameter, and the locking member includes a tapered portion adapted to pressingly engage the inner diameter of the end of the spring element when. the connector is fastened to the locking member. In a preferred embodiment, the tapered portion of the locking member is flexible.

In accordance with another embodiment of the apparatus of the present invention, the connector includes an inner diameter, and the end of the spring element and the inner diameter of the connector include non-circular cross-sections.

In accordance with another embodiment of the apparatus of the present invention, the end of the spring element extends in a longitudinal direction, and the apparatus includes a pair of flexible bushings disposed on the connecting arm on opposite sides of the longitudinal direction.

In accordance with another embodiment of the apparatus of the present invention, the spring element comprises a composite material.

In accordance with another embodiment of the apparatus of the present invention, the apparatus includes a substantially cylindrical stabilizer extending within the spring element. Preferably, the stabilizer includes an end, and the end of the stabilizer includes external splines, the locking member including an inner diameter, the inner diameter of the locking member including internal splines, the external splines of the stabilizer and the internal splines of the locking member cooperatively interacting with each other.

The present invention is intended for connecting a first, essentially tubular element and a second element, comprising a connection element which is fixed to the first element and a locking element. The present invention is characterized in that the connection element and the locking element are arranged on each side of the second element and are connected by means of at least one fastening component extending through the second element. This provides a secure connection suitable for large compression and torsion forces for attaching a tubular element, for example a spring element in a vehicle.

According to a preferred embodiment of the present invention, the second element has at least one bushing. In addition, that locking element is attached to the connection element by means of the bushing. This provides a number of benefits. In particular, it can be mentioned that the bushing helps to remove the load from the attachment of the spring element to the connection arm. In addition the bushing provides a function that ensures that loads can be absorbed in the direction of the axis, as well as turning and bending moments.

In addition the arrangement according to the present invention means that a stabilizer (for example in the form of a flexible shaft of steel or fiber material) can be arranged extending within the spring element. This has the advantage of saving space.

BRIEF DESCRIPTION OF THE DRAWINGS

The present invention will be described in the following detailed description with reference to the attached drawings, in which.

PREFERRED EMBODIMENT

Figure 1:
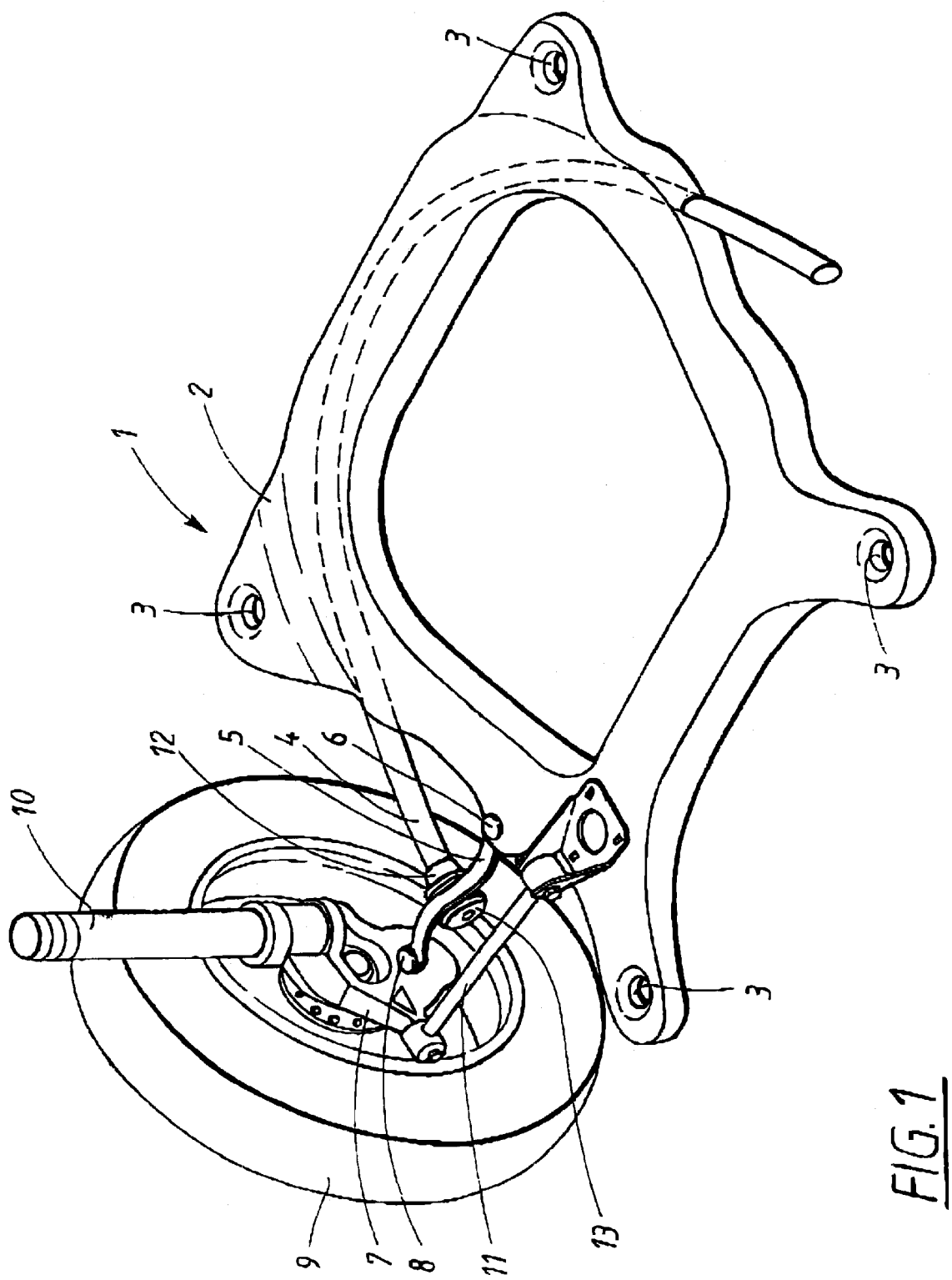
FIG. 1 is a top, perspective view of a wheel suspension for a vehicle fitted with the present invention.

FIG. 1 shows the fundamental design of the present invention. According to a preferred embodiment this invention is connected to a wheel suspension 1 on a vehicle (not shown). The wheel suspension 1 comprises a framework element or sub-frame, 2, which is designed to be connected to the body of the vehicle by means of four fixing points 3 in the form of holes.

The framework element 2 supports a substantially cylindrical and U-shaped spring element 4, the end of which is designed to be attached to the connection arm 5. According to this embodiment the spring element 4 is manufactured out of composite material, which is light in weight and very strong. In addition, the spring element 4 can be manufactured out of twisted or braided glass fiber or carbon fiber in a plastic matrix, for example epoxy or polyamide. The spring element 4 can have a diameter of the order of about 40 mm and a wall thickness of the order of about 4 to 6 mm. In addition, the connection arm 5 is attached to the framework element 2 by means of a first attachment point 6 and to a wheel bearing 7 by means of a second attachment point 8.

In a known manner, the wheel bearing 7 supports a vehicle wheel 9 and also constitutes an attachment for a spring strut 10 which in turn comprises a shock absorber. For the sake of simplicity in FIG. 1 only one connection arm 5, and one wheel bearing 7, are shown. It is, however, obvious that both ends of the spring element 4 are arranged in a similar manner.

In addition the framework element 2 is connected to the wheel bearing 7 by means of a connecting rod 11. Where the arrangement according to the figure is used for a rear wheel suspension, this connecting rod consists of a tie rod, and where the arrangement is used for a front wheel suspension, the connecting rod consists of a steering connecting rod.

The end of the spring element 4 is connected to the connection arm 5 using the mounting arrangement according to the present invention. As will be described in greater detail below, for this purpose each end of the spring element 4 is provided with a connection element 12 for attaching the spring element 4 to the connection arm 5. The connection element 12 operates in conjunction with a locking element 13 using screws (not shown in FIG. 1) which pass through the locking element 13, the connection arm 5 and the connection element 12. In this manner, the spring element 4 can be locked to the connection arm 5.

Figure 2:
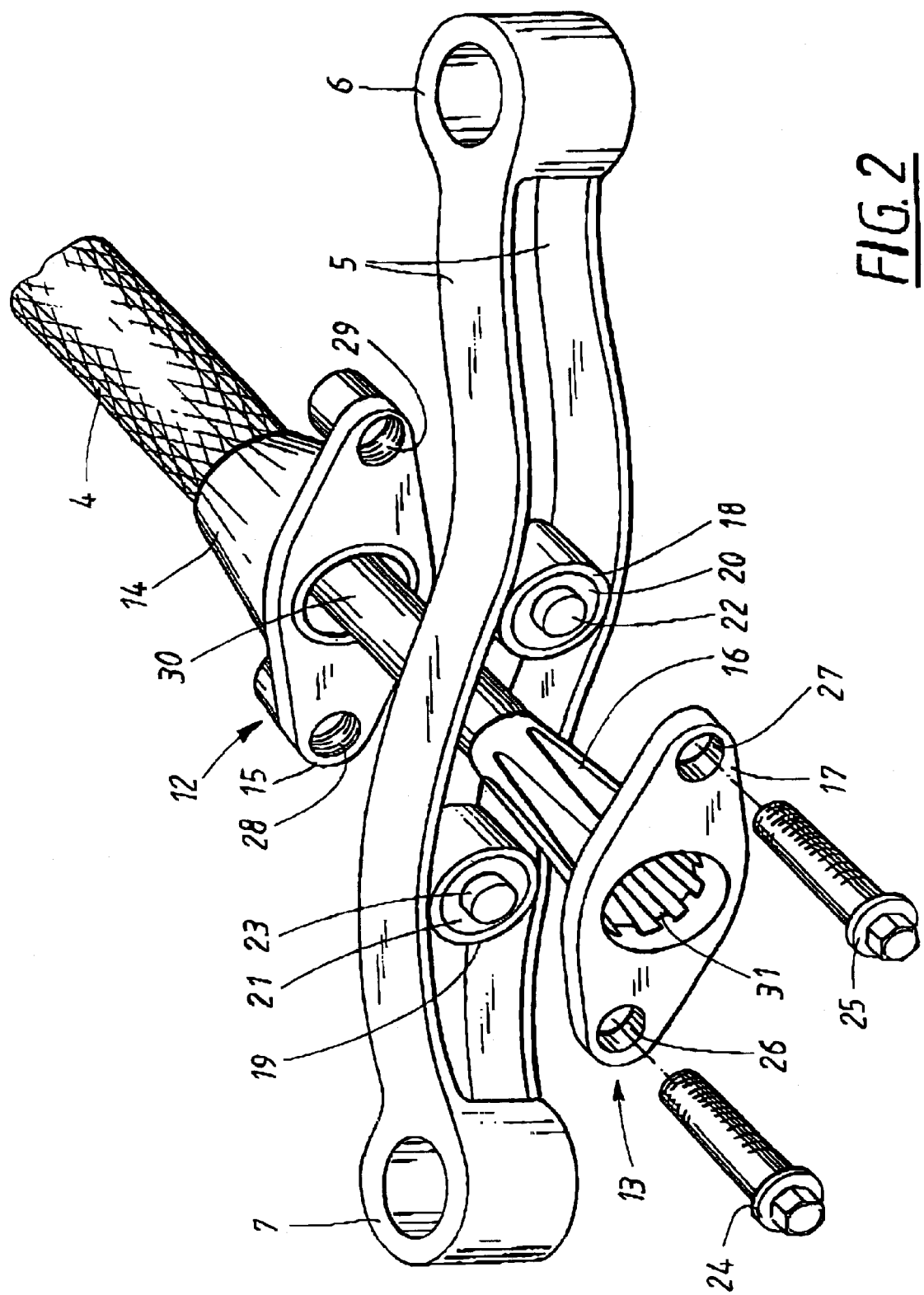
FIG. 2 is a front, enlarged, perspective disassembled view of a mounting arrangement according the present invention.

FIG. 2 is an enlarged perspective view showing the present invention in a disassembled state. The figure shows that the ends of the spring element 4 are connected to the connection element 12, which in turn is constructed of a tubular element 14 at the back, and a plate or flange shaped element 15 at the front. The tubular element 14 is designed with an internal shape that essentially corresponds to the external shape of the spring element 4.

The tubular element 14 is preferably designed with a tapering internal shape, i.e. with a diameter that increases as it approaches the end of the spring element 4. In addition, tubular element 14 has a cross-section which is not circular, e.g. a hexagonal cross-section, which prevents the spring element 4 from turning inside the tubular element 14. In addition, connection element 12 is cast integrally with the end of the spring element 4. In this way, there is a connecting force as a result of the integral casting, and the spring element 4 is also mechanically prevented from turning inside the connection element 12. This provides for an effective locking of the spring element 4.

The integral casting can preferably be carried out by the connection element 12 being directly cast integrally at the end of the spring element 4 where the inside of the connection element directly provides the mold for the outside of the spring element 4.

The above-mentioned locking element 13 is provided with a nose element 16 facing the spring element 4. The locking element 13 also comprises an additional flange-shaped element 17, which is essentially the same shape as the flange element 15 belonging to the connection element 12. The nose element 16 tapers in the direction of the spring element 4 and has an outer shape that essentially corresponds to the internal shape of the end of the spring element 4. In addition, the nose element 16 is preferably shaped as a tube.

The connection arm 5 is designed as two primarily flat elements extending between the abovementioned fixing points, 6 and 7. In addition the connection arm 5 is provided with two tubular inlets, 18 and 19, in which there are two bushings, 20 and 21. The bushings, 20 and 21, are preferably manufactured of rubber or other flexible material and comprise in turn inner sleeves, 22 and 23, through which screws, 24 and 25, or similar locking elements are intended to be inserted.

The flange element 17 has holes, 26 and 27, passing through it. The distance between the centers of the holes, 26 and 27, is the same as the distance between the corresponding holes, 28 and 29, in the connection element 12 and the distance between the centers of the inner sleeves, 22 and 23, in the bushings, 20 and 21. In this manner, both the screws, 24 and 25, can be inserted through the flange element 17 and the connection arm 5 and thereafter screwed fast into the holes, 28 and 29, in the connection element 12 which are threaded for this purpose. When the locking element 13 is locked to the connection element 12 the nose element 16 is inserted at the same time into the space which is formed inside the end of the spring element 4.

The spring element 4 preferably supports a stabilizer 30 which is a known component that is used for suppressing excessive swaying of the vehicle. According to this embodiment the stabilizer 30 is arranged primarily as a cylindrical component extending inside the spring element 4, and therefore has an external diameter that is slightly less than the internal diameter of the spring element 4. The stabilizer 30 preferably consists of a flexible steel shaft with torsional strength. The shaft can, however, also be manufactured from materials other than steel, for example carbon fiber material. The stabilizer 30 can thus be made of braided glass fiber, carbon fiber or steel fiber produced to the required dimensions. The respective ends of the stabilizer 30 protrude a short distance from the spring element 4 and are intended to be inserted in the nose element 16. In addition the stabilizer is locked against turning movements by its ends being designed with external splines (not shown in the figure) that interact with internal splines 31 in a hole in the flange 17 of the locking element 13. This arrangement with the stabilizer 30 fitting inside the spring element 4 results in a saving of space in the vehicle.

The stabilizer 30 is preferably arranged to move freely in the axial direction inside the nose element 16. The stabilizer 30 is prevented, however, from disengaging with the said splines 31, by providing the locking element 13 with a suitable (not shown) cover or by designing the flange element 17 with a closed end. Alternatively, the end of the stabilizer 30 can be provided with a stop element that prevents it from coming out of the nose element 16.

In addition, there is preferably (not shown) sound-deadening material arranged between the stabilizer 30 and the inside of the spring element 4. Such sound-deadening material can be plastic, rubber, felt, or the like and is intended to prevent unwanted noise occurring as a result of the stabilizer 30 hitting against the spring element 4.

Figure 3:
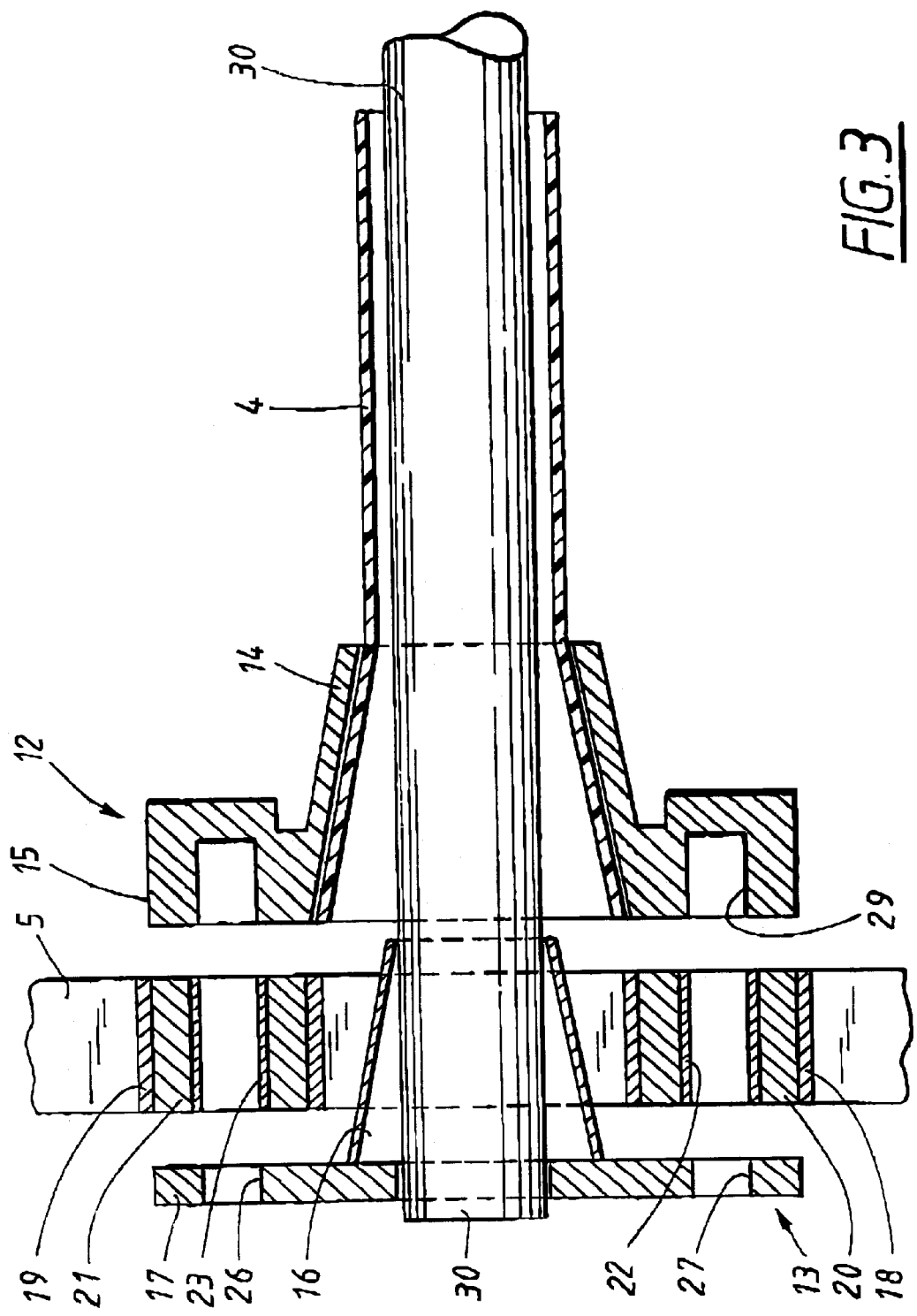
FIG. 3 is a side, elevational, cross-sectional view of a mounting arrangement according to the present invention.

FIG. 3 shows a cross-section from above of the mounting arrangement according to this embodiment of the present invention. This figure shows that the spring element 4 is shaped so that its diameter increases gradually along the length of the connection element 12 in the direction of the connection arm 5. In this manner, the spring element 4 follows the internal taper of the connection element 12, which means that the spring element 4 cannot be pulled out of the connection element 12 without being deformed or crushed. The diameter of the end of the spring element 4 which is next to the connection area 5 is preferably from about 10 to 30% greater than the diameter at the opposite side of the connection element 12. However, the end of the spring element 4 is designed with a wall thickness which is essentially as large as that at the opposite side of the connection element 12 (or with a slightly reduced thickness in the direction towards the connection arm 5). An advantage of this arrangement is that the torsional strength of the spring element 4 increases nearer to its end, which in turn reduces the twisting of the composite material inside the connection element 12.

When mounting the complete arrangement the stabilizer 30 is first pushed through the spring element 4 and its integrally-cast connection element 12, whereby the end of the stabilizer 30 is located through the nose element 16 so that it is locked in the splines 31 (see FIG. 2). Thereafter the flange 17 of the locking element 13 is aligned in accordance with the location of the bushings, 20 and 21. It can be noted that the bushings are preferably located symmetrically on each side of an axis defined by the lengthways extent of the spring element 4. The flange 15 of the connection element 12 is also aligned. Finally, the flanges, 15 and 17, are locked together by screwing in the screws, 24 and 25. When they are locked together the nose element 16 is pressed into the tapering end of the spring element 4. It can be noted that the nose element 16 is designed so that it clamps against the inside of the end of the spring element 4, i.e. so that the end is clamped against the inside of the tubular element 14. The nose element 16 and the spring element 4 are designed so that this clamping force is greatest closest to the end of the spring element 4 next to the connection arm 5, and so that it reduces in the direction along the spring element 4. In this manner, the stresses are reduced at the most critical section, i.e. where the spring element 4 protrudes out of the connection element 12 (i.e. at the right side of the connection element 12 as shown in FIG. 3).

In order to eliminate the requirement for a good fit between the nose element 16 and the inside of the spring element 4, the outside of the nose element 16 can be covered with a relatively thick layer of rubber (not shown). In addition, the nose element 16 can be designed as a flexible element made of plastic or rubber. Such a flexible construction would then reduce the cost (due to a reduction in the manufacturing precision required) and would also make any dismantling easier.

By means of the arrangement according to this invention the flexible rubber bushings, 20 and 21, transfer the turning moment of the spring element 4 to the connection arm 5 (i.e. for vertical suspension of the wheel 9) at the same time as providing the necessary deformation in the axial direction (for longitudinal suspension of the wheel 9) without resulting in high bending stresses at the connection of the spring element 4 to the fixing point 3 of the connection arm. In addition, the connection element 12, the nose element 16 and the inner sleeves, 22 and 23, of the bushings form a fixed connection with the spring element 4, at the same time as the connection arm 5 forms a flexible connection with the spring element 4 by means of the rubber bushings, 20 and 21.

The present invention provides a means whereby the spring element 4 can be connected to the connection arm 5 so that the bending moment, turning moment, tension and compression forces are transferred between the components without the components being subjected to too great a concentration of stresses.

The present invention is not restricted to the embodiments described above and in the figures, but can be varied within the framework of the following patent claims. For example, a viscous adhesive can be applied between the inside of the end of the spring element 4 and the nose element 16 in order to provide for a better connection between these components.

Different materials can be used to manufacture the various constituent components. For example, the connection arm 5, connection element 12 and locking element 13 can be manufactured of steel, aluminum, magnesium or reinforced plastic. The stabilizer 30 is suitably manufactured from a flexible but torsionally strong steel shaft (that can be twisted like a cable) or alternatively out of glass fiber or carbon fiber and epoxy.

In addition, it is not in principle necessary for the function of the present invention for a separate stabilizer 30 to be used. According to an alternative embodiment this component can therefore be omitted. A stabilizing function can be obtained by means of the spring element 4 if this is designed with a sufficiently high stabilizing action.

In addition, in principle the nose element 16 can be omitted if the locking element 13 is dimensioned to take the stresses that arise.

The present invention can be used in many different applications where a tubular element is to be connected to another, often rigid, component, and where considerable forces are to be transmitted. In particular, the present invention is appropriate for tubular elements made of composite material. For example, the present invention can be used for connecting a composite drive shaft to a universal joint or a torsion spring to an axle or body fixing point. In principle, the transmission of forces between the connected components can be made rigid and in this case the said bushings, 20 and 21, can be omitted.

In addition, it is also the case that, instead of the screws, 24 and 25, other fixing devices can be used, for example rivets.

Finally, the spring element 4 can also be designed with a circular or non-circular cross-section. For example, it can be designed with an oval or hexagonal cross-section. However, the section is preferably closed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus comprising a spring element having an end, a connecting arm of a vehicle wheel suspension, a connector fixed to said end of said spring element and disposed on one side of said connecting arm, a locking member disposed on another side of said connecting arm, and fastening means extending through said connecting arm for attaching said connector to said locking member whereby said spring element is mounted to said connecting arm, said end of said spring element having a tapered portion which increases in a direction towards said connecting arm.

2. The apparatus of claim 1 wherein said connecting arm includes at least one bushing, and wherein said locking member is attached to said connector through said at least one bushing.

3. The apparatus of claim 2 wherein said fastening means attaches said connector to said locking member through said at least one bushing.

4. The apparatus of claim 1 wherein said end of said spring element includes an inner diameter, and wherein said locking member includes a tapered portion adapted to pressingly engage said inner diameter of said end of said spring element when said connector is fastened to said locking member.

5. The apparatus of claim 4 wherein said tapered portion of said locking member is flexible.

6. The apparatus of claim 1 wherein said connector includes an inner diameter, and wherein said end of said spring element and said inner diameter of said connector include non-circular cross-sections.

7. Apparatus comprising a spring element having an end, a connecting arm of a vehicle wheel suspension, a connector fixed to said end of said spring element and disposed on one side of said connecting arm, a locking member disposed on the other side of said connecting arm, and fastening means extending through said connecting arm for attaching said connector to said locking member whereby said spring element is mounted to said connecting arm, said end of said spring element extending in a longitudinal direction, said apparatus including a pair of flexible bushings disposed on said connecting arm on opposite sides of said longitudinal direction.

8. The apparatus of claim 1 wherein said spring element comprises a composite material.

9. The apparatus of claim 1 further including a substantially cylindrical stabilizer extending within said spring element.

10. Apparatus comprising a spring element having an end, a connecting arm of a vehicle wheel suspension, a connector fixed to said end of said spring element and disposed on one side of said connecting arm, a locking member disposed on another side of said connecting arm, fastening means extending through said connecting arm for attaching said connector to said locking member, and a substantially cylindrical stabilizer extending within said spring element whereby said spring element is mounted to said connecting arm, said stabilizer including an end, said end of said stabilizer including external splines, said locking member including an inner diameter, said inner diameter of said locking member including internal splines, said external splines of said stabilizer and said internal splines of said locking member cooperatively interacting with each other.

* * * * *